(12) United States Patent
Lee et al.

(10) Patent No.: US 9,407,370 B2
(45) Date of Patent: Aug. 2, 2016

(54) APPARATUS AND METHOD FOR TRANSMITTING AND RECEIVING VISIBLE LIGHT COMMUNICATION

(71) Applicant: Electronics and Telecommunications Research Institute, Daejeon (KR)

(72) Inventors: Seok-Jin Lee, Daegu (KR); Jin Young Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 518 days.

(21) Appl. No.: 13/846,650

(22) Filed: Mar. 18, 2013

(65) Prior Publication Data

US 2013/0266314 A1    Oct. 10, 2013

(30) Foreign Application Priority Data

Apr. 5, 2012    (KR) .......................... 10-2012-0035436

(51) Int. Cl.
*H04B 10/06* (2006.01)
*H04B 10/2507* (2013.01)
*H04B 10/116* (2013.01)

(52) U.S. Cl.
CPC .......... *H04B 10/2507* (2013.01); *H04B 10/116* (2013.01)

(58) Field of Classification Search
CPC ............... H04B 10/116; H04B 10/516; H04B 10/1149; H04B 10/40; H04B 10/11; H04B 10/60; H04B 10/2507; H04B 10/07953; H04B 3/46; H04B 3/542; H04B 10/616; H04L 1/0668; H04L 5/0051; H04L 27/223; H04L 27/227; H04L 27/265

USPC ...................... 398/202, 172, 130, 77–79, 205
See application file for complete search history.

(56) References Cited

U.S. PATENT DOCUMENTS

| | | | | |
|---|---|---|---|---|
| 7,043,271 | B1* | 5/2006 | Seto ...................... | H01Q 3/2605 398/58 |
| 7,630,642 | B2* | 12/2009 | Tamai .................. | H04B 10/506 398/66 |
| 7,680,415 | B2* | 3/2010 | Minato ................. | H04J 14/005 398/155 |
| 7,693,429 | B1* | 4/2010 | Lowery ................ | H04B 10/548 398/182 |

(Continued)

FOREIGN PATENT DOCUMENTS

| KR | 1020070073380 A | 7/2007 |
|---|---|---|
| KR | 10-0949290 B1 | 3/2010 |
| KR | 1020110013798 A | 2/2011 |

OTHER PUBLICATIONS

High Speed VLC System Based on Turbo-Coded OFDM Scheme. Feb. 15-18, 2009.*

(Continued)

*Primary Examiner* — Hibret Woldekidan
(74) *Attorney, Agent, or Firm* — William Park & Associates Ltd.

(57) ABSTRACT

A visible light communication (VLC) transmitting apparatus modulates source data to an orthogonal frequency division multiplexing (OFDM) symbol according to an OFDM modulation method, inserts a diffusion code that is allocated to the VLC transmitting apparatus into a frequency axis of the OFDM symbol, converts the OFDM symbol in which the diffusion code is inserted to a visible light modulation signal, and transmits the converted visible light modulation signal. Thereby, a signal of the VLC transmitting apparatus in which a VLC receiving apparatus wants can be easily detected.

7 Claims, 8 Drawing Sheets

(56) References Cited

U.S. PATENT DOCUMENTS

| | | | | |
|---|---|---|---|---|
| 8,515,286 B2* | 8/2013 | Liu | ........................ | H04B 10/61 398/158 |
| 8,634,725 B2* | 1/2014 | Jang | ..................... | H04B 10/116 398/118 |
| 8,682,181 B2* | 3/2014 | Liu | .................... | H04B 10/5161 375/239 |
| 8,737,191 B2* | 5/2014 | Freda | .................. | H04L 27/2602 370/208 |
| 8,879,922 B2* | 11/2014 | Liu | ...................... | H04B 10/112 398/152 |
| 9,020,338 B2* | 4/2015 | Walewski | ............ | H04B 10/114 398/158 |
| 9,036,999 B2* | 5/2015 | Kaneda | ................ | H04B 10/516 370/203 |
| 2006/0115272 A1* | 6/2006 | Minato | ................. | H04J 14/005 398/77 |
| 2007/0196108 A1* | 8/2007 | Tamai | .................. | H04B 10/506 398/77 |
| 2008/0130803 A1 | 6/2008 | Chang et al. | | |
| 2008/0304833 A1* | 12/2008 | Zheng | ................ | H04B 10/1143 398/135 |
| 2009/0190927 A1* | 7/2009 | Minato | ................ | H04J 14/005 398/77 |
| 2010/0034540 A1* | 2/2010 | Togashi | ............... | H04B 10/116 398/118 |
| 2010/0284479 A1* | 11/2010 | Saito | ...................... | H04B 1/707 375/260 |
| 2011/0026924 A1 | 2/2011 | Chung et al. | | |
| 2011/0229147 A1* | 9/2011 | Yokoi | .................. | H04B 10/116 398/172 |
| 2012/0155889 A1* | 6/2012 | Kim | ..................... | H04B 10/116 398/193 |
| 2012/0257898 A1* | 10/2012 | Yokoi | ................. | H04L 27/2697 398/76 |

OTHER PUBLICATIONS

Adaptive Control of OFDM Data Rate for LED Visible Light Communications in Different Free Space Transmission Distances and Offsets @ 2012.*

Indoor Broadcasting via White LEDs and OFDM Hany Elgala, Student Member, IEEE, Raed Mesleh, Member, IEEE and Harald Haas, Member, IEEE @ Aug. 2009.*

Won-Suk Jang et al., On Adaptive Narrowband Interference Cancellers for Direct-Sequence Spread-Spectrum Communication Systems, The Korean Institute of Communications and Information Sciences Journal, Oct. 2003, vol. 28 No. 10C.

* cited by examiner

[PN CODE]

FIG. 8

APPARATUS AND METHOD FOR TRANSMITTING AND RECEIVING VISIBLE LIGHT COMMUNICATION

CROSS-REFERENCE TO RELATED APPLICATION

This application claims priority to and the benefit of Korean Patent Application No. 10-2012-0035436 filed in the Korean Intellectual Property Office on Apr. 5, 2012, the entire contents of which are incorporated herein by reference.

BACKGROUND OF THE INVENTION (a) Field of the Invention

The present invention relates to a method and apparatus for transmitting/receiving visible light communication. More particularly, the present invention relates to a method and apparatus for transmitting/receiving while removing interference in visible light communication.

(b) Description of the Related Art

Nowadays, as lighting devices using a light-emitting diode (LED) as a light source are widely used, visible light communication (VLC) technology that can communicate with the LED lighting device is being introduced.

VLC technology is communication technology that loads data to light of a visible light wavelength band that a human being can recognize by eye and that transfers the data wirelessly. As VLC technology uses light of a visible light wavelength band, VLC technology is distinguished from existing wire optical communication technology and infrared ray wireless communication technology. Further, VLC technology can be freely used without regulation or permission from a frequency use viewpoint, unlike radio frequency communication, and thus has excellent convenience and physical security and has a distinction in which a user can determine a communication link by eye.

A VLC system using an LED light source has multipath channel characteristics in which there are several paths of light between a transmitter and a receiver, not one. However, most executing VLC systems are limited to only a line of sight (LOS) environment. Further, when a plurality of transmitters and receivers exist, performance is degraded due to interference by different signals and thus technology research for minimizing performance degradation due to interference by different signals is necessary.

SUMMARY OF THE INVENTION

The present invention has been made in an effort to provide a method and apparatus for transmitting/receiving VLC having advantages of removing interference by different signals in VLC.

An exemplary embodiment of the present invention provides a transmitting method of a VLC transmitting apparatus. The transmitting method includes: modulating source data to an orthogonal frequency division multiplexing (OFDM) symbol according to an OFDM modulation method; inserting a diffusion code that is allocated to the VLC transmitting apparatus into a frequency axis of the OFDM symbol; converting the OFDM symbol into which the diffusion code is inserted to a visible light modulation signal; and transmitting the visible light modulation signal.

The diffusion code may include one of a pseudo noise code (PN code), a Walsi code, a Kasami code, and an M-sequence.

The diffusion code may include an M-sequence.

The converting of the OFDM symbol may include converting the OFDM symbol into which the diffusion code is inserted to a radio frequency signal, and controlling turning-on of a plurality of light emitting diodes according to the radio frequency signal.

Another embodiment of the present invention provides a receiving method of a VLC receiving apparatus. The receiving method includes: detecting a visible light wireless signal; converting the visible light wireless signal to a digital signal; detecting a signal of a VLC transmitting apparatus wanting to receive using a diffusion code that is inserted into the digital signal; removing the diffusion code from the detected signal; and restoring the signal in which the diffusion code is removed to original data by demodulating with an OFDM method.

The diffusion code may include one of a PN code, a Walsi code, a Kasami code, and an M-sequence.

The diffusion code may include an M-sequence.

The detecting of a signal may include calculating an auto-correlation value between a sequential sample signal of a signal into which the diffusion code is inserted among the digital signal and a diffusion code of the VLC transmitting apparatus wanting to receive, and detecting a digital signal corresponding to a signal having a maximum value of the calculated auto-correlation value.

The calculating of an auto-correlation value may include calculating a log likelihood ratio of the sample signal, and detecting a maximum value of an auto-correlation value between the log likelihood ratio of the sample signal and the diffusion code of the VLC transmitting apparatus wanting to receive.

Yet another embodiment of the present invention provides a VLC transmitting apparatus including a modulation unit and a light source light emitting unit. The modulation unit modulates source data to an OFDM symbol according to an OFDM method and inserts a diffusion code that is allocated to the VLC transmitting apparatus into another subcarrier of the OFDM symbol. The light source light emitting unit includes a plurality of light emitting diodes (LED), and transmits an OFDM symbol into which the diffusion code is inserted through a visible light modulation signal by controlling turning-on of the plurality of LEDs.

The diffusion code may include one of a PN code, a Walsi code, a Kasami code, and an M-sequence.

The modulation unit may include: a symbol mapper that generates a modulation data symbol by performing symbol mapping of the source data; an inverse fast Fourier transform (IFFT) unit that transforms the modulation data symbol to a signal of a time domain by performing IFFT; a diffusion code insertion unit that inserts the diffusion code into a frequency axis of a modulation data symbol of the time domain; and a guard interval insertion unit that inserts a cyclic prefix into a time axis of the modulation data symbol of the time domain.

Yet another embodiment of the present invention provides a VLC receiving apparatus including a photoelectric converter and a demodulation unit. The photoelectric converter detects a visible light modulation signal and converts the visible light modulation signal to a digital signal. The demodulation unit detects a signal of a VLC transmitting apparatus wanting to receive from the digital signal using a diffusion code of the VLC transmitting apparatus wanting to receive, and restores the detected signal to original data by demodulating according to an OFDM method.

The diffusion code may include one of a PN code, a Walsi code, a Kasami code, and an M-sequence.

The demodulation unit may include a signal receiving unit that calculates an auto-correlation value between a sequential sample signal of a signal into which the diffusion code is inserted among the digital signals and the diffusion code of the VLC transmitting apparatus wanting to receive, and that detects a digital signal corresponding to a signal having a maximum value among the calculated auto-correlation values.

The demodulation unit may further include: a diffusion code removing unit that removes the diffusion code from the digital signal corresponding to a signal having the maximum value; a guard interval removing unit that removes a cyclic prefix from a signal in which the diffusion code is removed; an FFT unit that transforms a signal in which the diffusion code is removed to a signal of a frequency domain by performing FFT; and a symbol demapper that restores the signal of a frequency domain to original data by symbol demapping.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method and apparatus for transmitting/receiving VLC according to an exemplary embodiment of the present invention will be described in detail with reference to the drawings.

Figure 1:
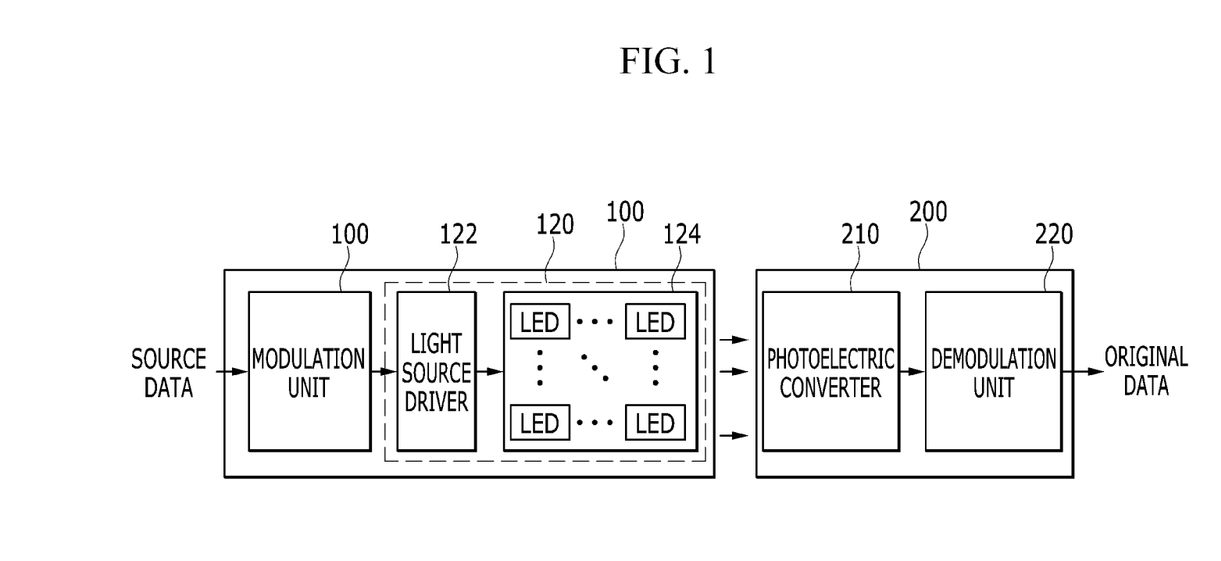
FIG. 1 is a block diagram illustrating a configuration of a VLC transmitting/receiving apparatus according to an exemplary embodiment of the present invention.
Figure 2:
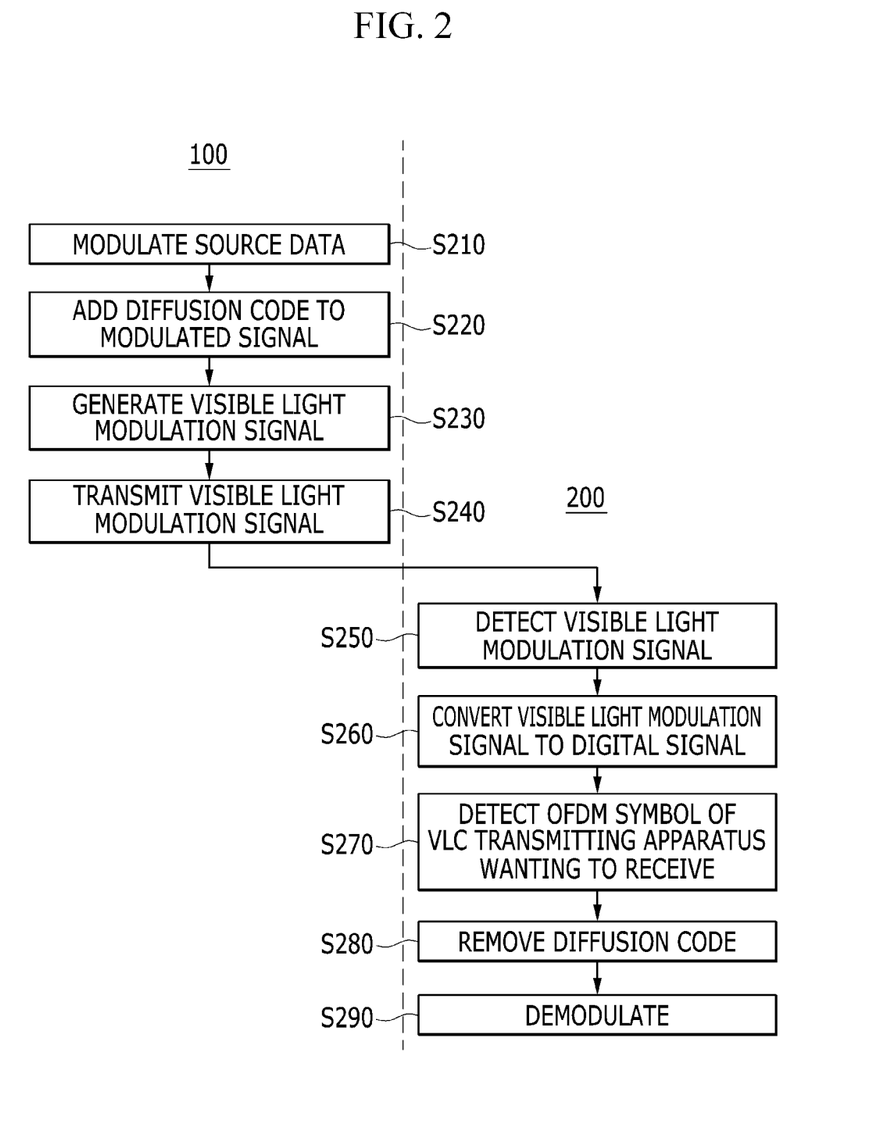
FIG. 2 is a flowchart illustrating a transmitting/receiving method of a VLC transmitting apparatus according to an exemplary embodiment of the present invention.

FIG. 1 is a block diagram illustrating a configuration of a VLC transmitting/receiving apparatus according to an exemplary embodiment of the present invention, and FIG. 2 is a flowchart illustrating a transmitting/receiving method of a VLC transmitting apparatus according to an exemplary embodiment of the present invention.

Referring to FIG. 1, a VLC transmitting apparatus 100 includes a modulation unit 110 and a light source light emitting unit 120. Further, a VLC receiving apparatus 200 includes a photoelectric converter 210 and a demodulation unit 220.

Source data for VLC is input to the modulation unit 110.

As shown in FIG. 1, the modulation unit 110 modulates the source data according to an OFDM modulation method (S210). The modulation unit 110 modulates source data with an OFDM method, and in order for the VLC receiving apparatus 200 to identify a signal of the VLC transmitting apparatus 100, the modulation unit 110 adds a diffusion code that is allocated to the VLC transmitting apparatus 100 to a frequency axis of an OFDM-modulated signal (S220). As the diffusion code, a pseudo noise (PN) code, a Walsi code, a Kasami code, and an M-sequence may be used.

The light source light emitting unit 120 includes a light source driver 122 and a light-emitting diode (LED) light source module 124. The light source driver 122 drives the LED light source module 124. The LED light source module 124 includes a plurality of LEDs.

The light source driver 122 generates a driving signal that controls turning-on and turning-off states of a plurality of LEDs according to an OFDM-modulated signal, and outputs the driving signal to the LED light source module 124. The LED light source module 124 is turned on according to a driving signal of the light source driver 122 and generates and transmits a visible light modulation signal corresponding to light that is emitted from a plurality of LEDs (S230-S240).

The photoelectric converter 210 detects the visible light modulation signal (S250) and converts the visible light modulation signal to a digital signal through photoelectric conversion (S260). Such a photoelectric converter 210 includes a photo-diode or an image sensor.

The demodulation unit 220 demodulates an OFDM symbol corresponding to a digital signal and restores the OFDM symbol to original source data. The demodulation unit 220 detects an OFDM symbol of the VLC transmitting apparatus 100 using a diffusion code that is inserted between OFDM symbols (S270), removes the diffusion code from the detected OFDM symbol, and performs OFDM demodulation corresponding to OFDM modulation (S280-S290). Therefore, the received visible light modulation signal is restored to original source data.

Figure 3:
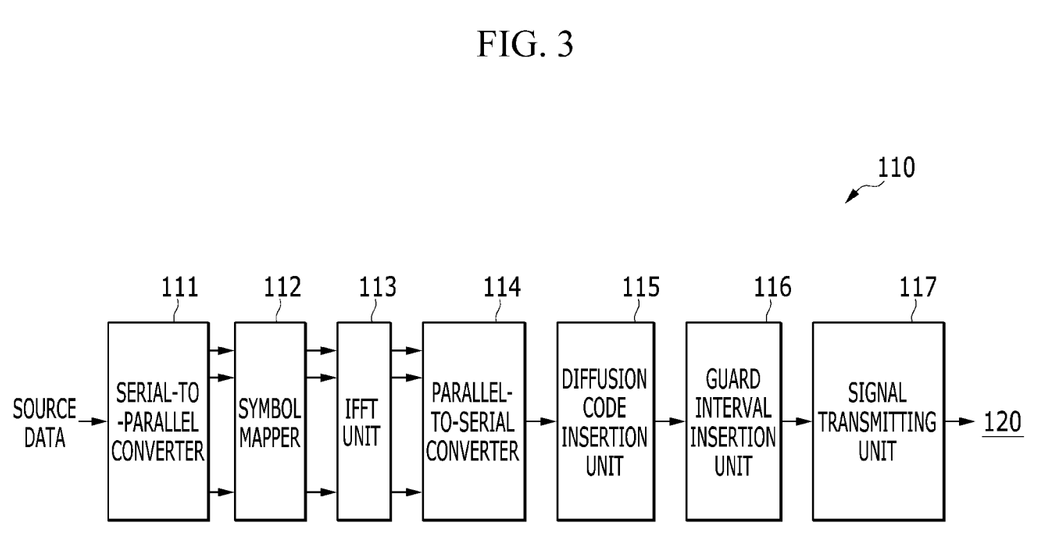
FIG. 3 is a block diagram illustrating a configuration of a modulation unit that is shown in FIG. 1.

FIG. 3 is a block diagram illustrating a configuration of a modulation unit that is shown in FIG. 1.

Referring to FIG. 3, the modulation unit 110 includes a serial-to-parallel converter 111, a symbol mapper 112, an IFFT unit 113, a parallel-to-serial converter 114, a diffusion code insertion unit 115, a guard interval insertion unit 116, and a signal transmitting unit 117.

When serial data corresponding to source data to transmit is input, the serial-to-parallel converter 111 converts the serial data to parallel data.

The symbol mapper 112 symbol-maps the parallel data through digital modulation such as binary phase shift keying (BPSK), quadrature amplitude modulation (QAM), 16-QAM, and 64-QAM and generates a parallel modulation data symbol.

The IFFT unit 113 performs IFFT of the parallel modulation data symbol. Therefore, the parallel modulation data symbol is converted from a frequency domain to a time domain.

The parallel-to-serial converter 114 converts the parallel modulation data symbol that is converted to a time domain to a serial modulation data symbol.

The diffusion code insertion unit 115 inserts the diffusion code that is allocated to the VLC transmitting apparatus 100 into the serial modulation data symbol. The diffusion code is an intrinsic code that is allocated to the VLC transmitting apparatus 100, and the VLC transmitting apparatus 100 can distinguish the modulation data symbol by the diffusion code. The diffusion code insertion unit 115 inserts the diffusion code that is allocated to the VLC transmitting apparatus 100 into a frequency axis of serial modulation data symbol to transmit.

The guard interval insertion unit 116 inserts a cyclic prefix (CP) into the serial modulation data symbol. In this case, all of a CP, a modulation data symbol, and a diffusion code are referred to as an OFDM symbol.

The signal transmitting unit 117 converts the OFDM symbol from a digital signal to an analog radio frequency signal and transfers the converted OFDM symbol to the light source light emitting unit 120. Therefore, the light source light emitting unit 120 converts an OFDM signal to a visible light modulation signal and transmits the converted visible light modulation signal.

Figure 4:
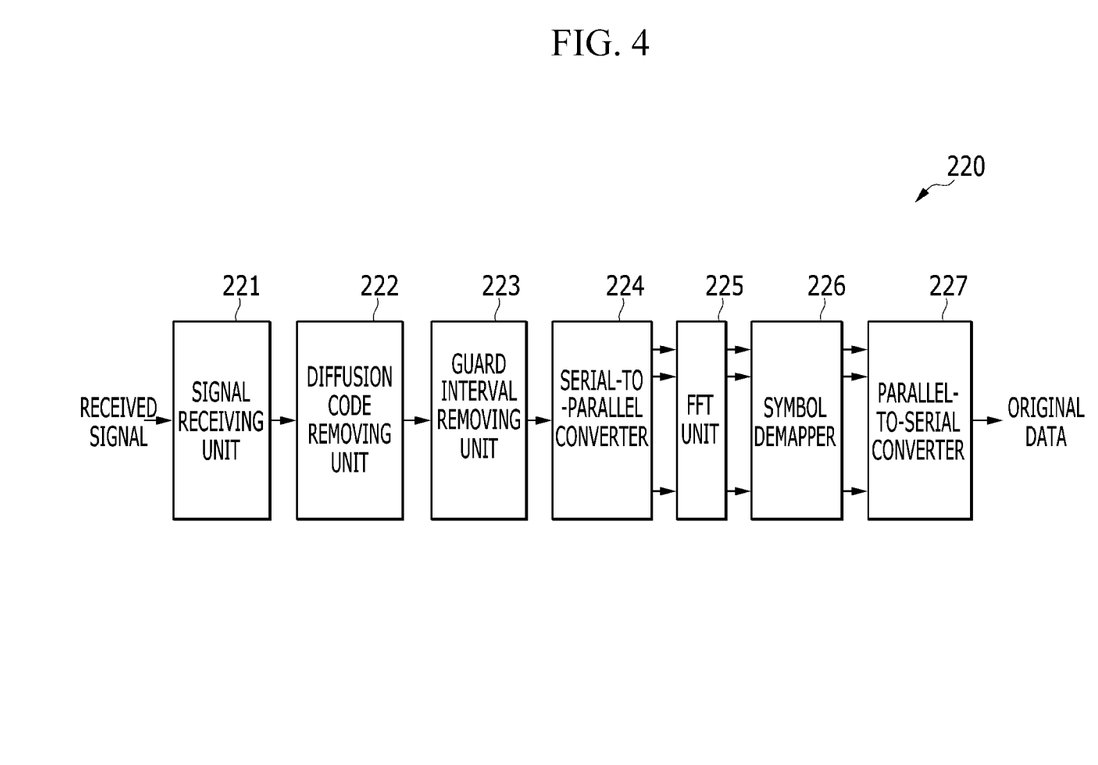
FIG. 4 is a block diagram illustrating a configuration of a demodulation unit that is shown in FIG. 1.

FIG. 4 is a block diagram illustrating a configuration of a demodulation unit that is shown in FIG. 1.

Referring to FIG. 4, the demodulation unit 220 includes a signal receiving unit 221, a diffusion code removing unit 222, a guard interval removing unit 223, a serial-to-parallel converter 224, an FFT unit 225, a symbol demapper 226, and a parallel-to-serial converter 227.

When the signal receiving unit 221 receives an OFDM symbol from the photoelectric converter 210, the signal receiving unit 211 detects an OFDM symbol of the VLC transmitting apparatus 100 wanting to receive using the inserted diffusion code and converts the corresponding OFDM symbol from a digital signal to an analog signal.

A transmitting signal of an i-th VLC transmitting apparatus 100 that passes through the IFFT unit 113 is represented by Equation 1.

$$x^i(n) = \left(\frac{1}{N_c}\right) \sum_{k=-K}^{K} X_k^i \exp\left(j\frac{2\pi k n}{N_c}\right) \quad \text{[Equation 1]}$$

Here, $N_c$ represents the number of subcarriers of one OFDM symbol, n is 0, 1, ..., $N_c-1$, and $N_c \geq 2k+1$.

When a transmitting signal of the i-th VLC transmitting apparatus 100 passes through the diffusion code insertion unit 115 and the guard interval insertion unit 116, an OFDM symbol is represented by Equation 2.

$$y^i(n) = x^i(n) + \sqrt{P_M} M^i(n-N_g-f(N_c+N_g)) + \sqrt{P_M} M^i(n-N_g-f(N_c+N_g)-N_M) \quad \text{[Equation 2]}$$

In Equation 2, $M^i$ represents a diffusion code of the i-th VLC transmitting apparatus 100, and $N_g$ represents the number of samples of CP. $N_M$ represents a length of a diffusion code, and $P_M$ represents electric power of the diffusion code.

A received signal having completely corresponding synchronization when the transmitting signal of the i-th VLC transmitting apparatus 100 passes through a channel is represented by Equation 3.

$$r(n) = \sum_{i=0}^{l-1} y^i(n) \otimes h^i(n) + G_n \quad \text{[Equation 3]}$$

In Equation 3, $h^i(n)$ represents a channel impulse response of the i-th VLC transmitting apparatus 100, and $G_n$ represents complex additive white Gaussian noise (AWGN).

Because the signal receiving unit 221 knows the diffusion code of the VLC transmitting apparatus 100 wanting to receive, the signal receiving unit 221 calculates an auto-correlation value between a sequential sample signal of a signal into which the diffusion code is inserted among received signals and the diffusion code of the VLC transmitting apparatus 100 wanting to receive and detects an OFDM symbol having a maximum value of the calculated auto-correlation values as a signal of the VLC transmitting apparatus 100 wanting to receive.

The signal receiving unit 221 obtains an auto-correlation value between a signal into which the diffusion code is inserted and the diffusion code of the VLC transmitting apparatus 100 wanting to receive through log likelihood calculation like Equations 4 to 6.

A signal into which the diffusion code is inserted is represented by Equation 4.

$$r(n) = \sum_{i=0}^{l-1} \sqrt{P_M}\, M^i(n-N_g-j(N_c+N_g)) \otimes h^i(n) + n_0(n) \quad \text{[Equation 4]}$$

A log likelihood function for obtaining an auto-correlation value between a signal into which the diffusion code is inserted and a diffusion code of the VLC transmitting apparatus 100 wanting to receive is represented by Equation 5, and an auto-correlation function for obtaining a maximum value of an auto-correlation value using a log likelihood ratio that is calculated by Equation 5 is represented by Equation 6.

$$L(S) = \ln p(r(n)) \quad \text{[Equation 5]}$$

$$\hat{S} = \arg\left\{\max_S L(S)\right\} \quad \text{[Equation 6]}$$

$$= \arg\left\{\max_E \sum_{n \in Sync} \ln(p(r(n)))\right\}$$

$$= \arg\left\{\max_\varepsilon \sum_{n=S}^{S+N_{M-Seq}-1} r(n) G^i(n-S)\right\}$$

In Equation 6, $G^i$ is a diffusion visible light code of the wireless communication receiving apparatus 200 wanting to receive and is a value that the VLC transmitting apparatus 100 knows.

The signal receiving unit 221 detects a signal having a maximum value of auto-correlation values that are obtained through Equation 6 with an OFDM symbol of the wireless communication receiving apparatus 200 wanting to receive, and converts the detected OFDM symbol from a digital signal to an analog signal.

In this way, by using the diffusion code of the wireless communication receiving apparatus 200 wanting to receive, the signal receiving unit 221 detects a signal of the wireless communication receiving apparatus 200 wanting to receive from a received signal in which a signal of another VLC transmitting apparatus exists as interference.

The diffusion code removing unit 222 removes the diffusion code from the analog OFDM symbol.

The guard interval removing unit 223 removes a guard interval from an analog OFDM symbol in which the diffusion code is removed.

The serial-to-parallel converter 224 converts the remaining modulation data symbols in which a guard interval is removed from the analog OFDM symbol from a serial signal to a parallel signal.

The FFT unit 225 performs FFT of a parallel modulation data symbol. Therefore, the parallel OFDM symbol is converted from a time domain to a frequency domain.

The symbol demapper 226 demaps a parallel modulation data symbol that is converted to a frequency domain through digital demodulation such as BPSK, QAM, 16-QAM, and 64-QAM, thereby generating parallel data.

The parallel-to-serial converter 227 converts the parallel data to serial data. Therefore, source data is restored.

FIGS. 5 to 8 are graphs illustrating a simulation result of an auto-correlation value according to a diffusion code that is obtained in a VLC receiving apparatus according to an exemplary embodiment of the present invention.

FIGS. 5 to 8 represent a simulation result of an auto-correlation value according to a diffusion code in a condition of the VLC receive apparatus 200 that is described in Table 1.

TABLE 1

| | |
|---|---|
| Magnitude of FFT | 256 |
| Photoelectric conversion efficiency | 0.53 A/W |
| The number of data subcarriers | 256 |
| Transmitting photoelectric power | 1 W |
| Physical detection area of photodiode | 1.0 cm$^2$ |
| FOV (field of view) | 60 deg. |
| Optical channel | LOS (line of sight), NLOS (non-line of sight) |
| SNR | 10 db |
| Diffusion code | PN code, Walsi code, Kasami code, and M-sequence |

Figure 5:
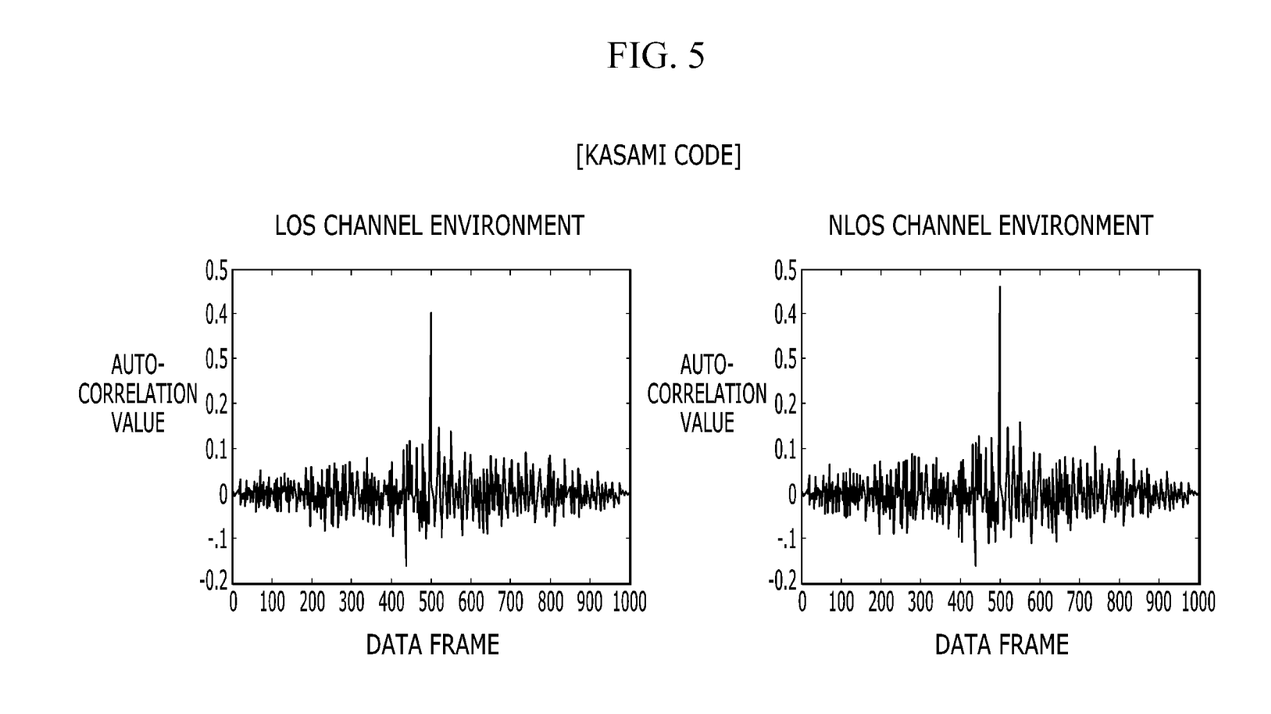
FIGS. 5 to 8 are graphs illustrating a simulation result of an auto-correlation value according to a diffusion code that is obtained in a VLC receiving apparatus according to an exemplary embodiment of the present invention.
Figure 6:
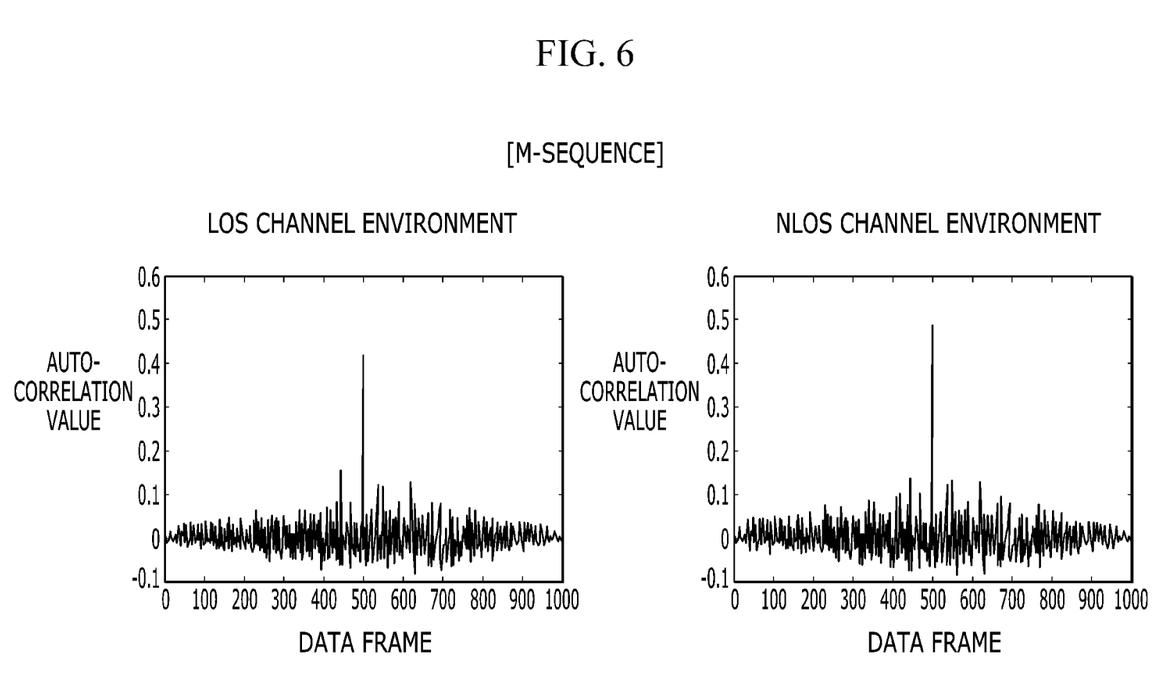
Figure 7:
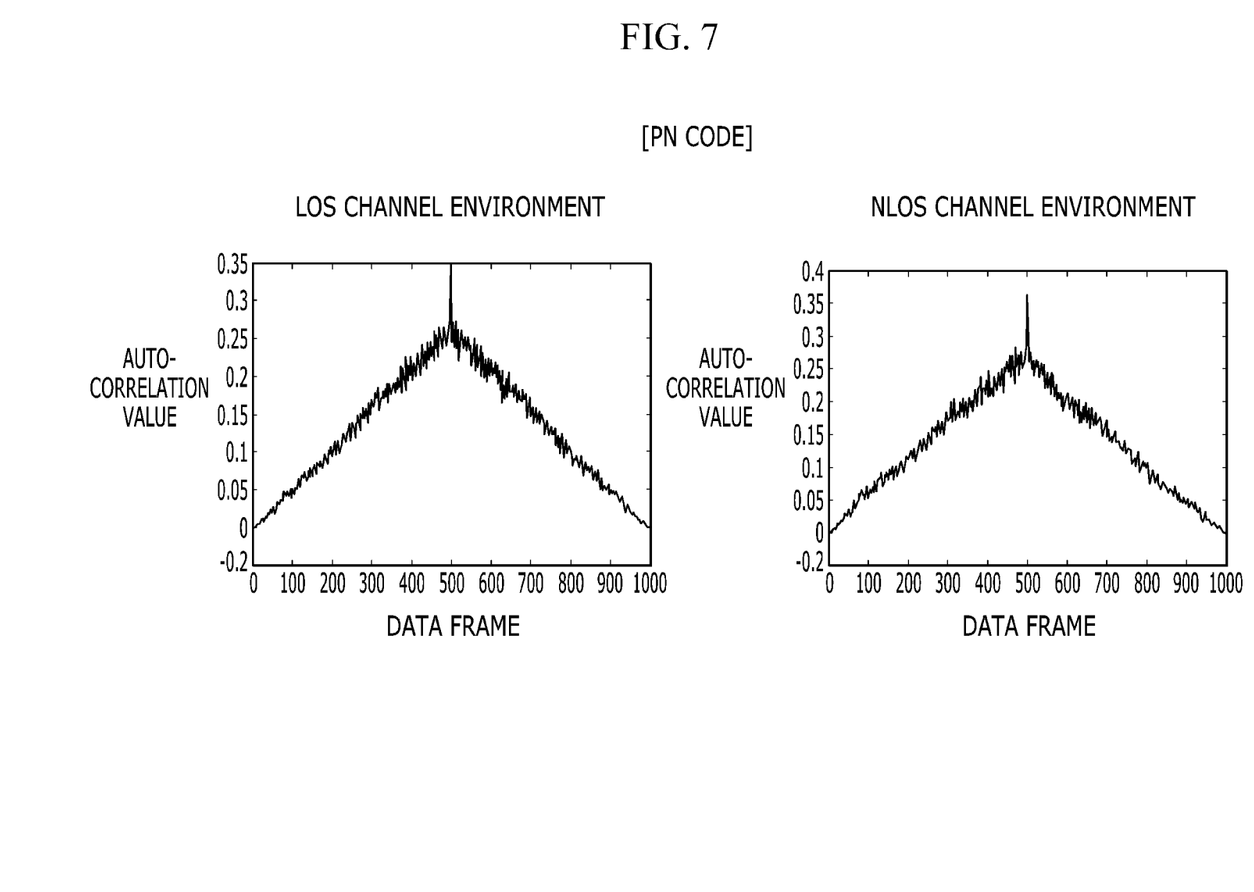
Figure 8:
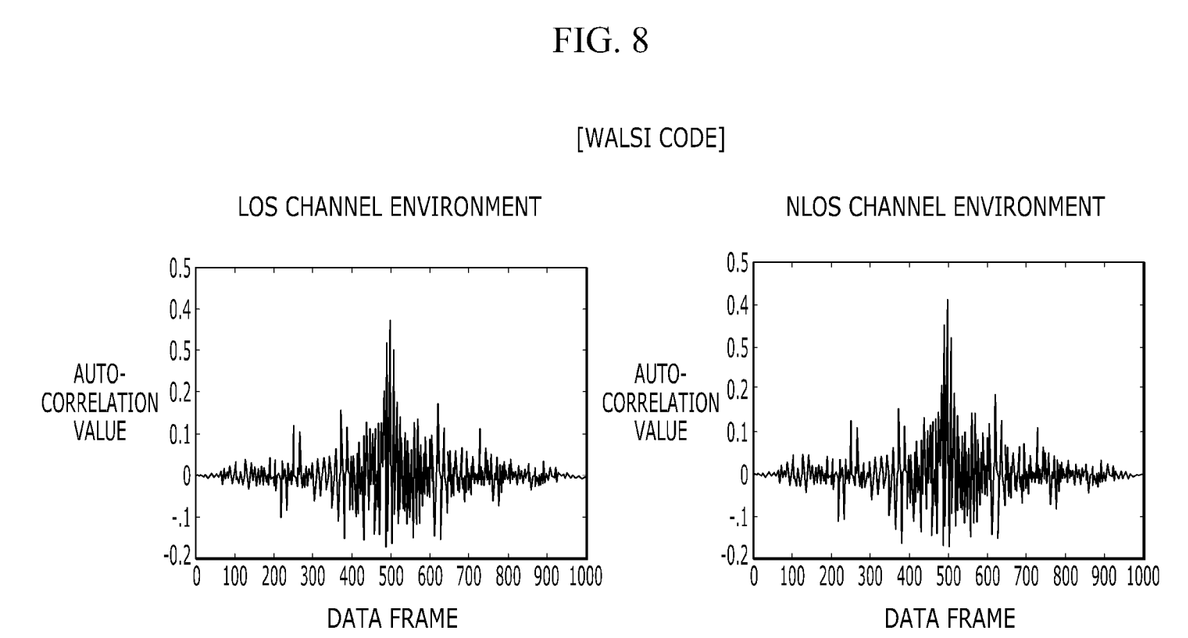

Specifically, FIG. 5 is a graph illustrating an auto-correlation value when using a Kasami code as a diffusion code, and FIG. 6 is a graph illustrating an auto-correlation value when using an M-sequence as a diffusion code. FIG. 7 is a graph illustrating an auto-correlation value when using a PN code as a diffusion code, and FIG. 8 is a graph illustrating an auto-correlation value when using a Walsi code as a diffusion code.

As can be seen in FIGS. 5 to 8, by using the diffusion code, the VLC receiving apparatus 200 can easily detect a signal of the VLC transmitting apparatus 100 wanting to receive through calculation of an auto-correlation value between a signal into which the diffusion code is inserted and the diffusion code of the VLC transmitting apparatus 100 wanting to receive.

Particularly, referring to FIG. 6, because a difference between an auto-correlation value corresponding to the signal of the VLC transmitting apparatus 100 wanting to receive and an auto-correlation value corresponding to another user's signal is large, when an M-sequence is used as a diffusion code, a signal of the VLC transmitting apparatus 100 wanting to receive can be detected further than when using a Kasami code, a PN code, and an Walsi code as a diffusion code.

According to an exemplary embodiment of the present invention, by using a diffusion code, interference can be efficiently removed and thus degradation of system performance due to interference can be minimized.

An exemplary embodiment of the present invention may not only be embodied through the above-described apparatus and/or method, but may also embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A receiving method of a VLC receiving apparatus, the receiving method comprising:
   detecting a visible light wireless signal;
   converting the visible light wireless signal to a digital signal;
   detecting a signal of a VLC transmitting apparatus wanting to receive using a diffusion code that is inserted into the digital signal;
   removing the diffusion code from the detected signal; and
   restoring a signal in which the diffusion code is removed to original data by demodulating with an OFDM method,
   wherein the detecting of a signal comprises:
      calculating an auto-correlation value between a sequential sample signal of a signal into which the diffusion code is inserted among the digital signal and a diffusion code of the VLC transmitting apparatus wanting to receive; and
      detecting a digital signal corresponding to a signal having a maximum value of the calculated auto-correlation value.

2. The receiving method of claim 1, wherein the diffusion code comprises one of a PN code, a Walsi code, a Kasami code, and an M-sequence.

3. The receiving method of claim 1, wherein the diffusion code comprises an M-sequence.

4. The receiving method of claim 1, wherein the calculating of an auto-correlation value comprises:
   calculating a log likelihood ratio of the sample signal; and
   detecting a maximum value of an auto-correlation value between the log likelihood ratio of the sample signal and the diffusion code of the VLC transmitting apparatus wanting to receive.

5. A VLC receiving apparatus, comprising:
   a photoelectric converter that detects a visible light modulation signal and that converts the visible light modulation signal to a digital signal; and
   a demodulation unit that detects a signal of a VLC transmitting apparatus wanting to receive from the digital signal using a diffusion code of the VLC transmitting apparatus wanting to receive, and that restores the detected signal to original data by demodulating according to an OFDM method,
   wherein the demodulation unit comprises a signal receiving unit that calculates an auto-correlation value between a sequential sample signal of a signal into which the diffusion code is inserted among the digital signals and the diffusion code of the VLC transmitting apparatus wanting to receive, and that detects a digital signal corresponding to a signal having a maximum value among the calculated auto-correlation values.

6. The VLC receiving apparatus of claim 5, wherein the diffusion code comprises one of a PN code, a Walsi code, a Kasami code, and an M-sequence.

7. The VLC receiving apparatus of claim 5, wherein the demodulation unit further comprises:
   a diffusion code removing unit that removes the diffusion code from the digital signal corresponding to a signal having the maximum value;
   a guard interval removing unit that removes a cyclic prefix from a signal in which the diffusion code is removed;

a fast Fourier transform (FFT) unit that transforms the signal in which the diffusion code is removed to a signal of a frequency domain by performing FFT; and a symbol demapper that restores the signal of a frequency domain to original data by symbol demapping.

* * * * *